United States Patent
Hubbs

(10) Patent No.: US 7,699,284 B2
(45) Date of Patent: Apr. 20, 2010

(54) THREE AXES ADJUSTABLE FOUNDATION TARGET MOUNT

(75) Inventor: William O. Hubbs, Cedar Hill, MO (US)

(73) Assignee: Hubbs Machine & Manufacturing, Inc., Cedar Hill, MO (US)

( * ) Notice: Subject to any disclaimer, the term of this patent is extended or adjusted under 35 U.S.C. 154(b) by 406 days.

(21) Appl. No.: 11/803,196

(22) Filed: May 14, 2007

(65) Prior Publication Data

US 2007/0272817 A1 Nov. 29, 2007

Related U.S. Application Data

(60) Provisional application No. 60/808,049, filed on May 24, 2006.

(51) Int. Cl.
*A47B 91/00* (2006.01)

(52) U.S. Cl. .............. 248/346.06; 248/188.4; 248/419; 33/295

(58) Field of Classification Search ............ 248/419, 248/188.4, 346.06, 346.5; 33/286, 293, 295; 359/819, 822

See application file for complete search history.

(56) References Cited

U.S. PATENT DOCUMENTS

| 2,476,381 | A | * | 7/1949 | Peavey | 248/188.4 |
|---|---|---|---|---|---|
| 3,350,783 | A | * | 11/1967 | Whitehead | 33/228 |
| 4,549,360 | A | | 10/1985 | Allen | |
| 5,073,005 | A | | 12/1991 | Hubbs | |
| RE35,907 | E | * | 9/1998 | Obrecht | 248/657 |
| 6,669,160 | B2 | * | 12/2003 | Steinmetz et al. | 248/346.01 |
| 7,110,194 | B2 | * | 9/2006 | Hubbs | 359/822 |

* cited by examiner

*Primary Examiner*—J. Allen Shriver, II
*Assistant Examiner*—Bradley H Duckworth
(74) *Attorney, Agent, or Firm*—Paul M Denk

(57) ABSTRACT

A three axes or three dimensional adjustment foundation target mount for use in industrial applications to provide for precise settings for machining and related operations, includes a body, the body has internal threads therein, an expandable vertical adjustment disc is provided therein, a lateral adjustment target cone is applied on top of the adjustment disc, and a top retainer disc is located and threadily engaged within the body, and holds a series of adjustment screws which can be adjusted to provide for the lateral and fore and aft adjustments to the target cone, to furnish, along with the adjustment disc, three dimensional adjustments for the survey target when applied to the mount. A cap is also provided to furnish coverage for the receptacle, following its precise setting and usage.

6 Claims, 3 Drawing Sheets

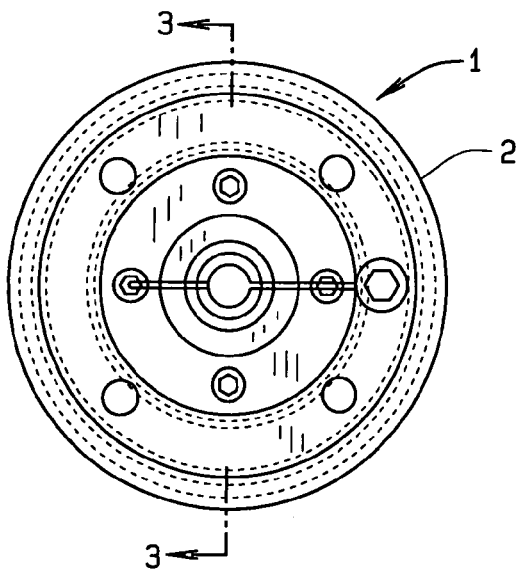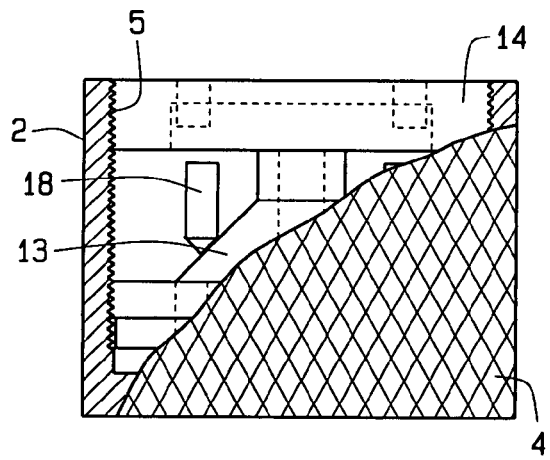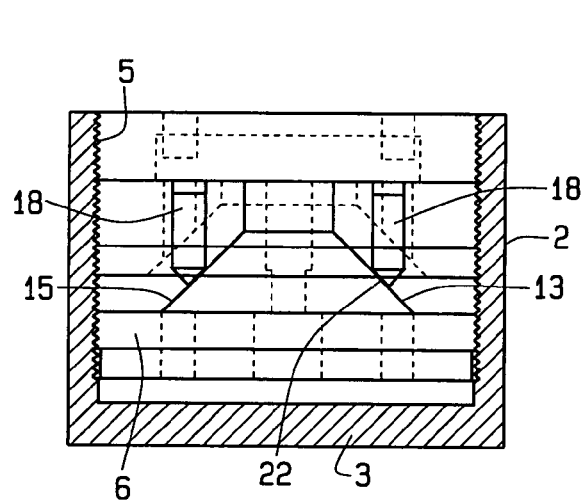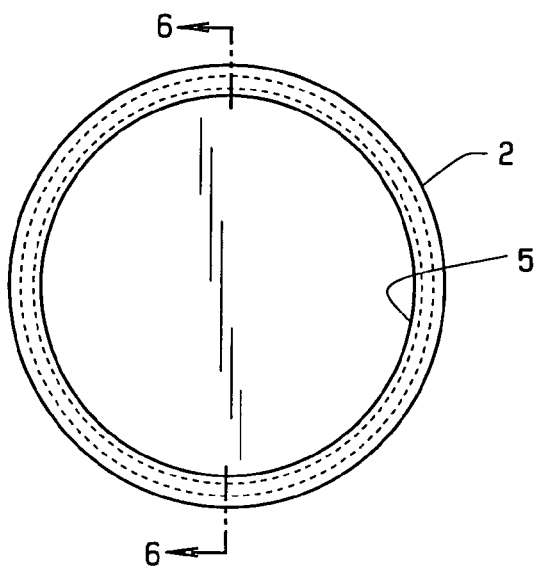
FIG. 1
FIG. 2
FIG. 3
FIG. 4

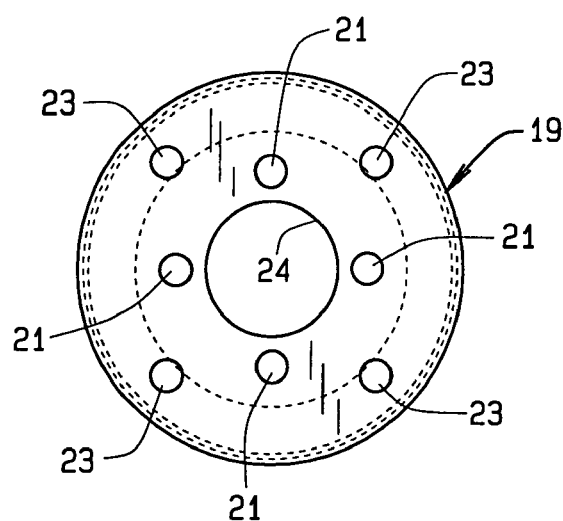
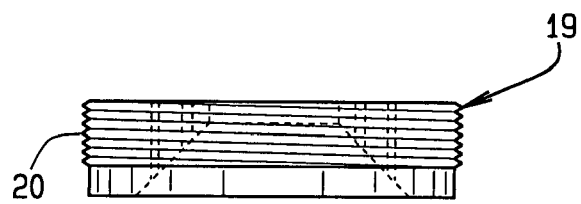
FIG. 11
FIG. 12
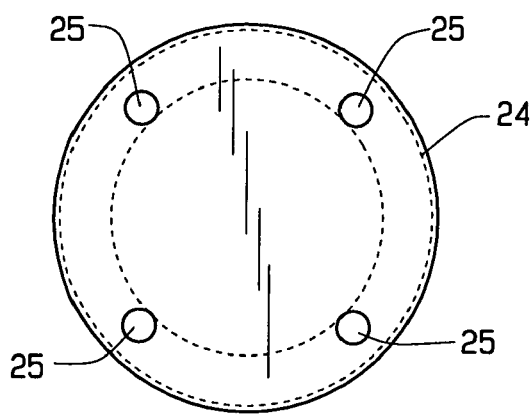
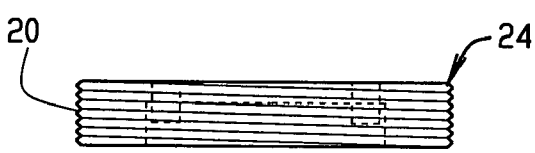
FIG. 13
FIG. 14

THREE AXES ADJUSTABLE FOUNDATION TARGET MOUNT

CROSSREFERENCE

This nonprovisional patent application claims priority to the provisional patent application having Ser. No. 60/808,049, which was filed on May 24, 2006.

FIELD OF INVENTION

This invention relates generally to industrial surveying, particularly to provide for precision setting for industry, and more specifically relates to a survey target receptacle that is floor or concrete mounted, having fine adjustability, in multiple axes, in order to furnish very precise settings for the instrumentation, machinery, and the parts being manufactured, in industrial operations.

BACKGROUND OF THE INVENTION

Various types of industrial survey and target means have been available in the art, most of them usually have a one dimension setting, in their usage and application. For example, U.S. Pat. No. 4,549,360, shows a floor target mount, but it is only adjustable in one axis, as can be seen therein. This does not provide for the precision required for industrial settings.

An adjustable floor target mount is available upon the market, under model No. 740, by a Brunson Products, but its particular target mount is only adjustable in two axes, the X and the Y axis, and can not be vertically adjusted, as along the Z axis, as desired.

Other types of foundation target inserts, are available in the art, such as a foundation sphere mount, but none of these products have adjustability in their fine and precise settings.

SUMMARY OF THE INVENTION

The concept of this invention to provide for an industrial survey target that is adjustable in three dimensions, both along the lateral and depth dimensions, such as along the X and Y axes, and in addition, provides for its adjustability within the vertical axis, as along the Z axis, to provide for full adjustability in all dimensions to furnish a very precise setting when the survey target is used in the setting of machinery, or the components.

The industry knows that there is a need for a floor or concrete mounted industrial survey target receptacle, that is finely adjustable in three axes. The receptacle of the current invention contemplates its reception into a hole in a concrete floor, or any other floor or other surface, as an example, at a set level, and set roughly into position for the X, Y, and Z locations. The Three Axes Adjustable Foundation Target Mount is then potted and secured in place using a plastic resin potting material, cement, or other common means for fixing such components in place.

Once the mount is secured into the floor, the critical target mounting hole and target mounting surface, or optional sphere mount nest may be finally adjusted vertically, and to the left and right, and forward and backward, to achieve critical locations for the survey targets. The Three Axes Adjustable Foundation Target Mount will accept targeting for use with a computer aided theodolite, the close range photogrammetry, and laser trackers, as examples.

The target mount of this invention consists of five precisely custom machined components, and mounting hardware for use in association therewith.

Essentially, the invention incorporates a body, that is formed having a knurled or other roughened outside diameter, for use in conjunction with the potting material, to provide for its grip and hold in position once mounted within a floor, regardless of what the floor may be composed of. The body further includes internal threads, that generally provides for the adjustment desired for the Z axis, to provide for adjustment of the target in the vertical direction, and the body further incorporates a cap mounting thereon.

The second component utilized in this target receptacle includes an expandable vertical adjustment disc. This disc has an outside diameter thread, which incorporates a slit past its center, with a tapered pipe thread on the center line of the slit, and to one side, so that when adjusted, such as when it is screwed further inwardly, it will widen the slit and thereby bind the disc against the interior diameter of the body, to hold the adjustment disc in position, once its vertical adjustment for the survey target receptacle has been precisely set. There are holes that are placed periodically around the outer approximate diameter of the adjustment disc, which allows for a spanner or other wrench to engage therein, to furnish easy turning, and therefore height adjustment, as the adjustment disc, in its threaded engagement within the body, can move up or down within the body, during its precise setting. Since the disc is in the Z axis adjustment, it threads up and down in the body. Once height is set the adjustment disc is then locked in place, by the tightening of the tapered pipe plug or other threaded member therein, that expands the defined slit, and thereby binds the adjustment disc within the body, as can be understood.

The next component is a lateral adjustment target cone. This target cone has a close tolerance bore or other configuration that accepts targets, whether it be of the sphere mount, or any of the other type of reflectors that are utilized in accommodation with surveying instruments, that furnish very precise setting in their usage. The target cone has a very close tolerance bore or other configurations, and the cone also has a threaded hole on a center line within the cone, to accept the insertion of these target instruments. The cone sets on top of the expandable vertical adjustment disc, as previously explained. The cone can be adjusted in any direction, that is laterally, or forwardly or to the rear, and its adjustment is obtained through the tightening or loosening of adjustment screws, with preferably matching angles, that are applied to a top retainer disc, to be subsequently defined. The threaded hole within the target cone is used for the initial mounting of the target mount.

Another component is the top retainer disc. This retainer disc has an outside diameter which is threaded, and has four or more threaded holes for the adjustment screws to be applied therein, and held in position for adjustment, and which are used to provide for the adjustment of the target cone, as previously explained. The holes within the retainer disc are placed to accept a spanner wrench, and the retainer disc threads over the target cone, within the internally threaded body, but the only contact made with the target cone are through the raising or lowering, through threaded engagement, of the adjustment screws within the top retainer disc, and as they are threaded downwardly, engage the surface of the target cone to provide for its shifting upon the adjustment disc, to furnish very precise lateral adjustment for the target cone, and its ability to accept and hold various targets, at a very precise location. The adjustment screws push and lock the target cone into its required and desired position, and fine setting.

Finally, a cap is provided over the retainer disc, and has outside diameter threads that screw into the body, and covers the internal components, as just explained, in order to keep them relatively clean from any deleterious matter. Holes are place into the cap, to accept a spanner wrench, as when it is located into its covering position, or removed, for a resetting of the survey target mount.

It is, therefore, the principal object of this invention to provide an industrial survey target receptacle or mount that can be adjusted in three dimensions, to provide for very precise settings for such a mount when installed.

Still another object of this invention is to provide a survey target receptacle that has relatively few components, but yet which can be very precisely set when applied for use in industrial operations.

Yet another object of this invention is to provide a survey target receptacle that can be fixedly applied into a floor or other surface, regardless of the material from which the floor is constructed, and held into position for fine setting, for use for industrial applications.

Yet another object of this invention is to provide a survey target receptacle that can be vertically adjustable.

Still another object of this invention is to provide a target mount which is simple to manufacture, inexpensive of construction, and easily installed, but yet provide very precise settings for components to be machined, through the use of a theodolite, photogrammatry, and laser tracking means.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings:

FIG. 1 is a top plan view of the foundation target mount of this invention;

FIG. 2 is a side view thereof, with a part of the body for the mount being removed, to show some of its internal components;

FIG. 3 is a cross sectional view taken along the line 3-3 of FIG. 1;

FIG. 4 is a top plan view of the body portion of the mount;

FIG. 11 is a top plan view of the top retainer disc;

FIG. 12 is a side view thereof;

FIG. 13 is a top plan view of the cap; and

FIG. 14 is a side view thereof.

DESCRIPTION OF THE PREFERRED EMBODIMENT

Figure 5:
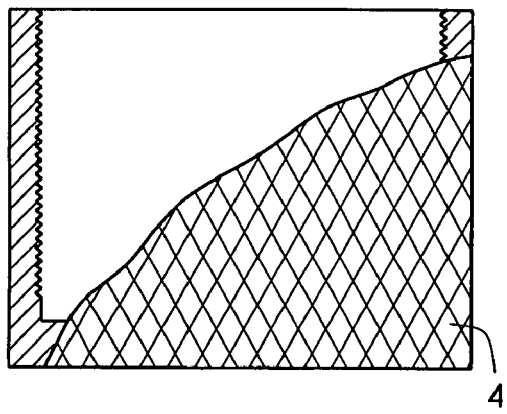
FIG. 5 is a partial sectional view of the mount, to show its internal threads.

In referring to the drawings, and in particular FIGS. 1-3, the composite Three Axes Adjustable Foundation Target Mount 1 of this invention is readily disclosed. The target mount includes an outer body or shell 2 and formed having an integral base 3 with the outer body of the side walls 2 being knurled, as at 4, or being otherwise roughened in configuration, so that as the mount is applied into a floor or other surface, regardless of whether it be a concrete floor, wood floor, or any other type of base material, when it is adhesively applied, cemented, or otherwise applied into the floor, it will be tightly bound thereto, because of the outer surface of the body, as noted.

Internally of the body are a series of threads 5 that extend the full height, internally, of said body, and for purposes of cooperating with other components as to be subsequently defined.

Figure 7:
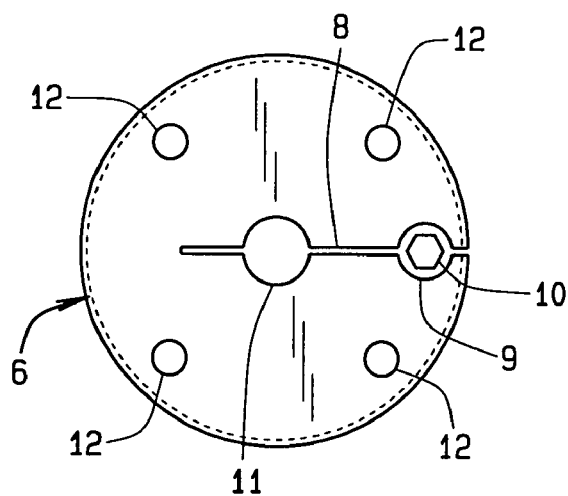
FIG. 7 is a top plan view of the expandable vertical adjustment disc of the invention.
Figure 8:
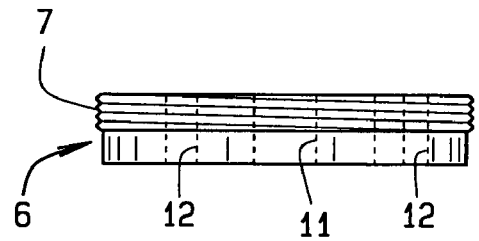
FIG. 8 is a side view thereof.

Provided within the body of the mount is an expandable vertically adjustable disc 6 and to better visualize the construction of this disc, and its method of installation and usage, reference is made to FIGS. 7 and 8 of the drawings. As can be noted, the disc 6 also has external threads, as at 7, and the disc threadily engages internally of the body 2, by threading downwardly upon its internal threads 5, into the approximate position as can be noted in FIG. 3. At this location, the disc can be adjusted for the proper height, within the body, when the Three Axes Adjustable Foundation Target Mount is refined into its final setting, and in this manner, furnishes the vertical or Z axis for adjustment of the mount, in its setting, for use for mounting of one of the survey targets, whether it be a spherical mount, or one of the other targets as normally used in this type of surveying. The adjustment disc is circular in configuration, as noted, and it has a slit, as at 8, provided for some distance across its diameter, as can be seen. The disc has an outward aperture formed therethrough, as at 9, and the aperture is likewise threaded, and into that aperture is a tapered and threaded pipe plug, as at 10, which can be either threaded into the aperture 9, or pressure fitted therein, in order to provide for binding of the adjustment disc within the body 2 of the mount, once the vertical setting has been made for the target. Thus, since the pipe plug is tapered, as the further it is tightened into the adjustment disc, the more it spreads the slit, and thereby slightly expands the outer circumference of the disc, to cause it to bind in its setting within the interior wall 2 of the adjustable mount.

As can also be noted, there is an aperture provided at the center of the adjustable disc, as at 11, and this opening is provided to furnish clearance for the insertion of the stem of any spherical or other type of target, that may be inserted within the mount, once it has been precisely set. Furthermore, there are a series of smaller openings 12 provided equally spaced around the outer perimeter of the said adjustment disc, and these openings are furnished for allowing the application of a spanner tool or wrench therein, to aid in the turning of the adjustment disc, before it has been tightened by its pipe plug, in order to obtain that precise vertical setting of the target mount, through the use of the surveying instrument, during its application. Thus, this provides for the precise vertical or Z axis setting for the mount in preparation for its usage and application in industrial survey.

Figure 6:
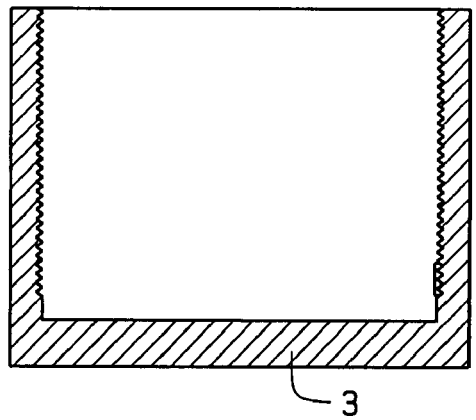
FIG. 6 is a cross sectional view of the body taken along the line 6-6 of FIG. 4.

The body itself is more accurately shown in FIGS. 4-6, and its components have generally already been analyzed, such as having the body or side wall 2, the internal threads 5, the base 3, and the knurled or otherwise roughened outer surface 4, as can be seen.

Figure 9:
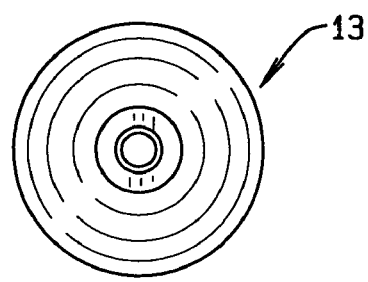
FIG. 9 is a top plan view of the lateral adjustment target cone of the invention.
Figure 10:
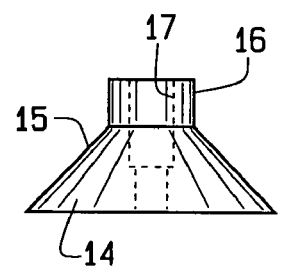
FIG. 10 is a side view thereof.

The next component that fits within the adjustable mount, as within its body 2, is the lateral adjustment target cone 13. This can be seen in FIGS. 9 and 10. This cone, as noted, includes a cone shaped base 14, which has a beveled surface 15 surrounding its bottom portion, and an upright boss 16, as can be noted. It also has an aperture 17 provided therethrough, and which accommodates the stem or nest (not shown) of any of the survey target that may be mounted therein, such as the spherical mount, or other type of target means, as known in the art. The purpose of the beveled edge 15 surrounding the cone is to provide a surface upon which the adjustment means of the next described component, or the top retainer disc, may contact, when pushing to cone to either side in its setting within the body 2, when it is applied therein. As for example, as can be seen in FIG. 3, the target cone 13 sets upon the previously described adjustment disc 6, and can slide upon its surface, depending upon the pressure applied to the cone, by means of the adjustment screws 18 and their setting therein.

The adjustment screws 18 threadily engage within the top retainer disc 19, generally as can be seen in FIGS. 11 and 12. This top retainer disc also is of annular shape, as can be noted, and furthermore includes a series of threads, as at 20, upon its outer circumference. Thus, the top retainer disc also threadily engages within the body 2, by threaded contact with its internal threads 5, as can be seen. The retainer disc 19 includes a series of apertures, as at 21, and these apertures are threaded and the adjustment screws 18 threadily engage therein, and extend downwardly therefrom, generally as can be noted in FIGS. 2 and 3. As can be noted, the bottoms of the adjustment screws, as at 22, have the same angle or incline as the beveled surface of the cone 13, so that when the screws are individually tightened downwardly, when one of the screws contacts the surface 15 of the cone, and is driven further downwardly, it pushes the cone in the opposite direction, in order to achieve the lateral adjustment in the setting of the cone within the survey target mount. Thus, since there are four equally spaced adjustment screws provided within the retainer disc 19, each of the screws may be individually adjusted, in order to push the cone either laterally to the sides, or fore and aft within the mount, to furnish the very precise locating of the target cone, within the receptacle or mount, and which furnishes the fine adjustment in the X and Y directions, for the mount, during its precise setting. Remember, the vertical setting has already been made through the adjustment of the vertical adjustment disc 6, within the body 2, of the mount, as previously explained. Hence, through a combination of adjustments, either through the manipulation of the adjustment screws, in a finely defined manner, to furnish very precise lateral and fore and aft shifting of the mounting cone 18, to obtain that three dimensional adjustment in the setting of the target cone, within its fixed relationship within the floor, or other instrument of support, in preparation for the use of industrial surveying for obtaining precision, or assembly functions, within an industrial plant.

When affixing the retainer disc within the body 2, there are also provided a series of supplemental apertures, as at 23, and which can accommodate the locating of a spanner tool or wrench, or other type of instrument, therein, to facilitate the threaded engagement of the retainer disc within the threaded interior of the body 2, during its installation.

As can also be seen, there is an opening 24 provided centrally through the retainer disc, and this is to provide adequate clearance for locating of the survey target therethrough, in order to allow for its accommodating within the target cone 13, as previously explained.

Finally, when all of these various instruments have been coupled together, such as the locating of the adjustment disc within the approximate bottom of the body 2, and then locating the target cone 13 therein, and furnishing its precise adjustment through the manipulation of the adjustment screws furnished within the retainer disc, and once the entire instrument has been set in a precise setting for use as an industrial survey target, a closure cap, as at 24, may likewise threadily engage within the upper end of the bottom 2, to furnish closure to the target receptacle 1. This device, also includes a series of apertures 25, which can accommodate the locating of another spanner tool or instrument (not shown) therein, to aide in its threaded engagement within the upper end of the body 2 of the receptacle. Obviously, the receptacle, and its target mount, will already have been used to provide for a precise setting in the various instrumentation used in the industrial application, and once that has been achieved, the cap will be located in place as a cover. But, if the further setting is required, the cap may be removed, the survey target located within its mounting components, such as within the target cone 13, to provide for a resetting of the instrumentation, if its further adjustment becomes a necessity. Once that is achieved, the cap can be replaced for closure.

Variations or modifications to the subject matter of this invention may occur to those skilled in the art upon review of the invention as provided herein. Such variations, if within the spirit of this development, are intended to be encompassed within the scope of the invention as defined. The summary of the invention, and the depiction of the invention within the drawings, as defined in the preferred embodiment, are set forth for illustrative purposes only.

The invention claimed is:

1. A three axes adjustable foundation target mount, including a body, the body capable of accepting an adjustment disc therein, the adjustment disc, through its manipulation, furnishing an adjustment to the Z axis for the mount during its usage, a target cone resting upon the adjustment disc, and a top retainer disc engaged within the body of the mount, the top retainer disc incorporating adjustment screws for providing lateral and fore and aft adjustments to the target cone, said adjustment screws engaged within the retainer disc, and when adjusted therein against the target cone to cause its lateral and fore shifting within the receptacle during its setting, said target cone having a beveled surface, said beveled surface contacted by the adjustment screws, the bottom of the adjustment screws having a contact surface for engagement with the target cone to achieve its shifting laterally and aft during its precise settings, whereby three dimensional adjustment can be made for any survey target applied to the target cone during its precise setting for use for industrial applications.

2. The target mount of claim 1 wherein the target screws include at their bottom inclined surfaces compatible with the surface of the target cone, to facilitate its shifting upon adjustment of the adjustment screws during their setting.

3. The target mount of claim 1 and further including a cap, said cap engaging within the body, to provide for its closure once a precise setting has been obtained.

4. The target mount of claim 2 wherein the vertical adjustment disc threadily engages within the receptacle body, the retainer disc threadily engages within the target body, and the cap threadily engages within the target body.

5. The target mount of claim 1 wherein the adjustment disc includes a slot extending approximately diametrically partially across said disc, and a tapered plug setting within the slot to provide for its expansion, when expanding the adjustment disc into a fixed setting once a vertical adjustment has been made for the target mount, during its precision setting.

6. The target mount of claim 5 wherein the tapered plug threadily engages within the adjustment disc slot.

* * * * *